United States Patent [19]

Ritter

[11] Patent Number: 4,747,975

[45] Date of Patent: May 31, 1988

[54] METHOD OF DISSOLVING, AND SOLVENTS FOR, DIFFICULT TO DISSOLVE CARBONATES

[75] Inventor: Gunter Ritter, Bunde, Fed. Rep. of Germany

[73] Assignee: U H T Umwelt und Hygienetechnik GmbH, Bielefeld, Fed. Rep. of Germany

[21] Appl. No.: 891,839

[22] Filed: Jun. 26, 1986

[30] Foreign Application Priority Data

Oct. 26, 1984 [DE] Fed. Rep. of Germany ....... 3439263

[51] Int. Cl.$^4$ ............................................. C23G 1/02
[52] U.S. Cl. ........................................ 252/87; 134/3; 134/41; 252/80
[58] Field of Search ................... 252/80, 87; 134/3, 41

[56] References Cited

U.S. PATENT DOCUMENTS

| | | | |
|---|---|---|---|
| 3,547,817 | 12/1972 | Hansen, Jr. et al. ................. | 210/696 |
| 3,633,672 | 1/1972 | Smith et al. .......................... | 166/279 |
| 3,639,263 | 1/1972 | Troscinski et al. .................. | 252/181 |
| 3,704,750 | 12/1972 | Miles et al. ........................... | 166/279 |
| 4,264,463 | 4/1981 | Katake et al. ......................... | 252/87 |

FOREIGN PATENT DOCUMENTS 6156781 12/1981 Japan ...................................... 252/87

*Primary Examiner*—Robert Wax
*Attorney, Agent, or Firm*—Sprung Horn Kramer & Woods

[57] ABSTRACT

A method of dissolving either a precipitate or deposit that contains essentially calcium carbonate comprising contacting the precipitate or deposit with a mixture comprising a first acid, the first acid being a Lewis acid in a concentration of 10 to 1000 mmoles/l, and a second acid, the second acid being a medium-strength to weak protonic acid or a partly deprotonated acid that yields at least one proton with the molar ratio of the second acid to the Lewis acid being between 1:1 and 6:1, the Lewis acid being a solution of at least one salt of a strong acid with cations selected from the group consisting of cations of a 3-valence main-group element, cations of a 3-valence transition element, cations of a 3-valence lanthanide, cations of a 3-valence actinide, cations of a 4-valence main-group element, cations of a 4-valence transition element, cations of a 4-valence lanthanide and cations of a 4-valence actinide.

8 Claims, 1 Drawing Sheet

METHOD OF DISSOLVING, AND SOLVENTS FOR, DIFFICULT TO DISSOLVE CARBONATES

This is a continuation-in-part of PCT/EP/00569, filed Oct. 26, 1985, now pending.

BACKGROUND OF THE INVENTION

1. Field of the Invention

The invention concerns a method of dissolving either a precipitate that contains essentially calcium carbonte ($CaCO_3$) or a deposit of that type, especially scale, by means of a Lewis acid in a concentration of 10 to 1000 mmoles/l.

2. Background Information

The loss of carbon dioxide to the atmosphere from water that has a high carbonate hardness and total hardness often results in supersaturation with calcium carbonate and magnesium carbonate ($MgCO_3$) and hence to more or less rapid precipitation of, mainly $CaCO_3$, but also of $CaCO_3.MgCO_3$, $MgCO_3$, and other impurities. The precipitates can appear as cloudiness and particles, but also frequently in the form of hard deposits and crusts of what is called "scale", that are difficult to remove by mechanical means alone.

Scale typically consists of more than 95% $CaCO_3$, less than 5% $MgCO_3$, and traces of phosphate and iron. Characteristic of scale, therefore, is that it contains perponderantly $CaCO_3$.

More scale is deposited as the temperature of the water rises and the carbonate hardness and total hardness increase. Scale can be detrimental in many ways, for example, by decreasing heat transfer, constricting pipes, encrusting pumps, valves, and heating devices, and diminishing the transparency and appearance of glass, plastic, and metal containers, and can lead to serious system malfunction. A significant example of the type of device affected is home automatic coffee and tea makers, and the periodic elimination of scale from such systems is unavoidable.

Since calcium carbonate is the major constituent of scale, the following discussion will be confined to that substance, although applicable, as well, is to dolomite encrustation, $CaCO_3.MgCO_3$, and $MgCO_3$, as well as other carbonates like basic copper carbonate or zinc carbonate.

That $CaCO_3$ can be more or less rapidly dissolved with acid—a strong inorganic acid like HCl of $HNO_3$, a medium-strength inorganic acid like $H_3PO_4$, a medium-strength to weak inorganic acid like HCOOH or $CH_3COOH$, or a weak organic acid like citric or tartaric acid—is known. Mixtures of various acids like $H_3PO_4$ and citric acid are also employed.

The often desirable very rapid dissolution of $CaCO_3$ can be attained only with strong inorganic acids. The rate of dissolution decreases rapidly with the strength of the acid and remains low even with polybasic acids because usually only one proton, the hydrogen ion ($H^+$), per molecule of acid, mainly the $H^+$ of the first dissociation stage specifically, participates in the reaction.

Practical experience and prototype testing have demonstrated that acids only with an initial dissociation constant pK that is lower than 1.5 to 2 will react with $CaCO_3$ at sufficient and practical speeds. Thus only appropriate concentrations of strong mineral acids, HCl and $HNO_3$ for example, will result in satisfactory $CaCO_3$-dissolution times. Even medium-strength acids with initial dissociation stages in the vicinity of pK 2 to 4, even phosphoric acid, that is, react considerably more slowly or must be employed at unreasonably high excesses, in extreme concentrations in other words. Acids with $pK_1$ values of between 4 and 5 react very slowly and their rates of dissolution can be accelerated only unsatisfactorily even at high concentrations. Weaker acids with $pK_1$ values higher than 5, finally, will not react at all at practically exploitable rates. These considerations with respect to acid strength apply not only to initial dissociation stages (where they represent the highest reaction stage of any acid), but to all dissociation stages of multiproton acids.

The acids or mixtures of strong and medium-strength acids practically employed at the state of the art, however, have drawbacks from the aspect of applications technology. Thus, even the medium-strength acids exhibit a high level of corrosion, an acrid and unpleasant odor that irritates the mucous membranes, a toxicity that is physiologically considerable, and an aggressiveness that can irritate the skin and mucous membranes. Such acids are detrimental to the environment and necessitate special safety measures in that they are not completely safe to employ or to securely package. Weak acids exhibit a very low and unsatisfactory dissolution of the $CaCO_3$, accompanied by the formation of cloudy solutions and by the secondary precipitation of calcium salts that are difficult to dissolve, whereas only part of the acid capacity, 25 to 50% for example, is utilized, making higher concentrations and larger amounts necessary.

Tests of weak and hence low-corrosion organic acids have demonstrated that they react very slowly, to a completely unsatisfactory extent, and often accompanied by the formation of cloudy solutions and secondary precipitations that include granules of $CaCO_3$. The considerably more reactive strong acids exhibit the drawbacks mentioned with respect to medium-strength acids to an even greater extent. Even tests of weak cationic aquo acids, $[Al(H_2O)_6]^{3+}$ and $[Fe(H_2O)_6]^{3+}$, for example, produce only slow reactions. Other cationic aquo acids with 3-valence or 4-valence cations also react only minimally with $CaCO_3$ or scale, and other Lewis acids perform just as poorly.

The use of aluminum-chloride solutions to dissolve deposits of lime is known from *Thermal Engineering* 29, 504–05 (1982). The rate of dissolution was essentially lower than that of hydrochloric acid, although higher than that of an organic, aliphatic, low-molecular acid. The corrosiveness of the aluminum chloride was lower than that of the organic acids.

SUMMARY OF THE INVENTION

An object of the present invention is to provide a method of dissolving and a solvent for scale that provide a high rate of dissolution of scale and scaly forms of $CaCO_3$, exhibit low corrosion and causticity, form clear solutions unaccompanied by secondary precipitation, and are easy to handle and safe to use.

This object is attained in accordance with the present invention in that a medium-strength to weak protonic acid or a partly deprotonated acid that yields at least one proton is added to a Lewis acid with the molar ratio of the added acid to the Lewis acid being between 1:1 and 6:1 and preferably between 1:1 and 6:1 and in that the Lewis acid is a solution of at least one salt of a strong acid, either with cations of a 3-valence main-group element, especially aluminum, of a transition element, especially iron, or of a lanthanide or actinide, or with 4-valence cations of a main-group element, of a transition element, or of one of the lanthanides or actinides, whereby the cations can optionally correspond to metals that the calcium carbonate is deposited on or that the solution is in contact with during the process of dissolution.

DETAILED DESCRIPTION OF THE INVENTION

Figure 1:
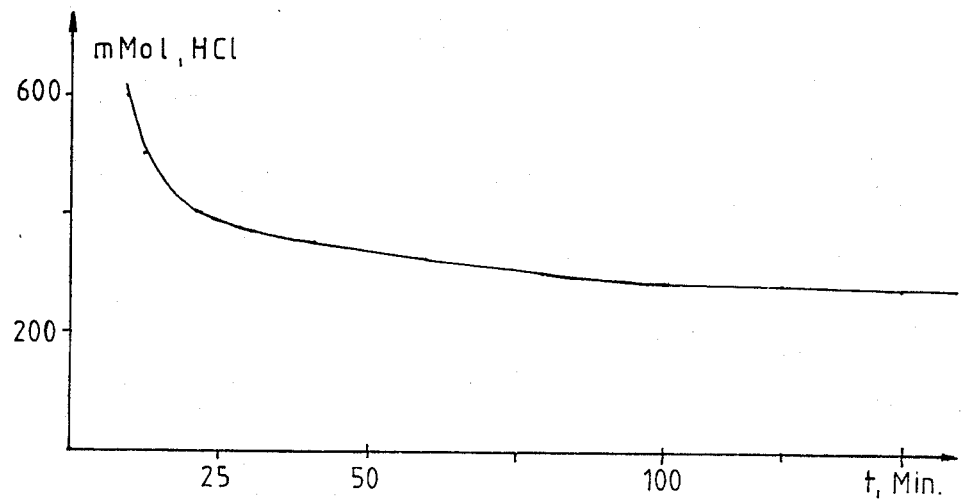
FIG. 1 is a curve for determining the hydrochloric-acid equivalents of the reactivity against granules of scale.

Surprisingly, mixtures of weak to medium-strength acids and salts of 3-valence and 4-valence cations, especially $Al^{3+}$ and $Fe^{3+}$ salts, behaved so differently from their constituents in reacting with $CaCO_3$ that complete novel reaction properties occurred. The stoichiometry of the mixture is important. Mixtures in which the molar ratio of the acid to the 3-valence or 4-valence metal ions ranged from 1:1 to 6:1 and preferably in the case of polybasic acids from 2:1 to 3:1 turned out to be especially effective.

Although the constituents of the mixture in themselves exhibited completely unsatisfactory reactions with $CaCO_3$, mixing them led to a significant and marked improvement in reactivity with respect to $CaCO_3$, whereby the following differences could be established as typical. A multiple higher, approximately 2 to 4 times as high rate of dissolution and a double or more increase in acid capacity are evident in comparison to the total of the individual dissolution capacities of the constituents of the solution. More than one $H^+$ (typically 2 to 4) was utilized, and the solutions were clear and free of precipitation. Corrosion is several orders of magnitude lower than that of strong acids of comparable reactivity and is furthermore surprisingly even lower than that of the pure constituents of the solvent when they are employed at equal concentration and until the same amount of scale is dissolved.

The powerfully increased acidity of the activated acids apparently increases both the degree of dissociation and the actual concentration of hydrogen ions. Surprisingly, however, the $H^+$ concentration is not increased enough to attain the aggressive and dangerous level of the very strong mineral acids ($\alpha=1$). The increase is, rather, moderate, to somewhere between the unactivated and mineral acids. Whereby, in contrast to the strong mineral acids, with which the extremely high concentration of hydrogen ions drops off rapidly, a moderately high concentration is maintained for a long while as the result of constant after dissociation and of the continuing establishment of equilibrium, even during the following dissociation stages. There is, on the other hand, a much lower concentration of hydrogen ions with the pure acids.

It has been demonstrated that whether the constituents were brought together before the reaction and added together, or contacted individually with the granules of $CaCO_3$ in the reaction vessel makes no difference. The increased reactivity was always observed because the originally weak to medium-strength acids were powerfully activated by stoichiometric additions of 3-valence or 4-valence metal salts, especially aluminum-chloride hydrate ($AlCl_3.6H_2O$) or iron-trichloride hydrate ($FeCl_3.6H_2O$).

Activating the acids by adding $AlCl_3.6H_2O$ and $FeCl_3.6H_2O$ was studied in phosphoric acid as an inorganic acid, in oxalic acid, L-tartaric acid, and citric acid was organic carboxylic acids, in phosphonobutane-tricarboxylic acid as a phosphonocarboxylic acid, and in 1-hydroxyethane-1,1-diphosphonic acid ("HEDP") as a phosphonic acid. The results are described in Tables 1 to 6 hereinbelow.

It can be deduced from the examples that a weak to medium-strength acid can be activated by adding a solution of a salt of 3-valence or 4-valence metal ions and a, preferably inorganic, acid residue of a strong acid in a molar ratio of 1:1 to 6:1.

The practical applicability of this novel principle of activation is limited only when the acid, even in the presence of the activator, or when the activator itself forms difficult-to-dissolve compounds with the material that is to be dissolved, especially with the calcium in the scale, even when these materials occur only as intermediaries. Still, it surprisingly turns out that even acids such as oxalic acid that form very difficult to dissolve calcium salts or deposits in the absence of the activator, can be utilized because the activator prevents the deposit from precipitating.

In addition to the examples discussed herein, one skilled in the art will be able to ascertain the susceptibility of other acids as to activation by the addition of Lewis acids in special applications even beyond the dissolution of scale. Among the substance that are believed to be appropriate are such inorganic acids as hydrochloric acid, polyphosphoric acid and its partly deprotonated anions, phosphorous acid, $H_2PO_3^-$, boric acid and its partly deprotonated stages, hydrofluoric acid, $SO_2$, sulfurous acid, hydrogen sulfite, hydrogen sulfate, organic protonic acids like formic acid, acetic acid, propionic acid, glycolic acid, glyoxylic acid, lactic acid, malonic acid, maleic acid, succinic acid, polyacrylic acid, citric acid, malic acid, and racemic acid, sugar acids like the mono- and dicarboxylic acids of triose, tetrose, pentose, hexose, and heptose and their biopolymeric forms, polyhydroxy and polyaldehyde carboxylic acids, α-amino acids, carbohydrates with vicinal dihydroxy groups, polyhydroxy compounds like sugar alcohols, glycol derivatives like ethylene glycol, glycerol, 1,2-propylene glycol, 1,2-butylene glycol, polyamino-polycarboxylic acids like nitrilo-triacetic acid and partly deprotonated EDTA stages or DTPA stages, polyamino-polyphosphonic acids like nitrilo-tris-(methylenephosphonic acid), ethylene diamine-tetra-(methylenephosphonic acid), diethylene triamine-penta-(methylenephosphonic acid), hexamethylene diamine-tetra-(methylenephosphonic acid), and aminophosphonic acids like n-(phosphonomethyl)glycine and n-(phosphonomethyl)iminodiacetic acid. Activation is also effective with all multiprotonic acids, and even especially effective with the partly deprotonated stages like the mono-, di-, tri-, and polyhydrogen Anions. Acids obtained naturally from vegetable sources like lemon juice can also be employed.

A marked activation of the aforesaid acids can be obtained with triply and quadruply charged cations, meaning the $M^{3+}$ cations of the main-group elements, especially aluminum, of the transition elements, especially iron, and of the lanthanides and actinides and the $M^{4+}$ cations of the main-group and transition elements, lanthanides, and actinides.

Subject to conditions in the home, the following properties are especially important in addition to those already listed herein in relation to the object of the invention. The solvent should not be toxic, should be physiologically unobjectionable, should be environmentally safe or break down satisfactorily into environmentally compatible products, and should have a not unpleasant aroma, its vapors and reaction vapors should not irritate the mucous membrane, and it should be usable without special safety precautions Although these additional demands do restrict the selection of constituents available to one skilled in the art, they still leave a large number of acids and activators. Especially worthy of mention are citric acid and L-tartaric acid, which, in combination with aluminum chloride or iron chloride, yield a cost-effective solvent for domestic applications.

Although the use of acids activated by the addition of Lewis acids was tested with particular reference to the very practical special application of removing scale and lime deposits from domestic automatic coffee and tea makers, since any scale or deposit of $CaCO_3$ or other carbonate can basically be dissolved and hence removed with the activated acids in accordance with the invention, other applications are also possible. Thus, deposits that contain lime can be removed from pipelines and scale from heating and cooling systems, heating and reaction vessels can be cleaned, and the solvents can be employed as acidic industrial cleaners, household cleaners, hospital cleaners, household lime removers, and acid solvents in industry and in the laboratory.

The way in which the acid and activator is employed is not decisive to the activation. Thus, there is a large number of forms of application including two-phase, two-constituent, and many-constituent products, wherein the acid and activator can be introduced to the reaction site in the form of aqueous or non-aqueous solutions and solvent-free solids, powder for example, or as compressed into tablets, granulates, pellets, extrudates, or agglomerates.

Preferred, however, are single-phase mixtures in an aqueous or non-aqueous solution or, preferably in a solid mixture or even in the form of a paste or suspension, a solid Lewis acid in a weak or medium-strength liquid acid for example.

To exploit the demonstrated anticorrosive action of the activator, it is preferable to employ anions corresponding to the material that is to be freed of scale or that comes into contact for a long time with the solvent and is especially sensitive to corrosion or functionally significant—an $Al^{3+}$ activator for aluminum containers, an $Fe^{3+}$ activator for iron containers, and a $Cr^{3+}$ activator for chromed containers.

In addition to the use of an acid with an activator, it is often more practical from the aspect of applications technology or economy to combine two or more acids with one activator, one acid with several activators, or two or more acids with two or more activators, bearing in mind the total molar ratio of 1:1 to 6:1.

A combination of different activators can be especially practical to decrease corrosion in metal alloys by an appropriate selection of the type of activators and of the ratio of the mixture of activating cations. Activation can accordingly be accompanied by the stabilization of surfaces of the activation metal and hence by decreased corrosion.

EXAMPLES

The examples were conducted with granulated $CaCO_3$ and also to some extent with finely divided screened granules of scale. The reactivity of acids activated with $Al^{3+}$ and/or $Fe^{3+}$ in relation to the $CaCO_3$ was studied.

The acid, in a molar quantity equivalent to approximately 400 to 600 mvals of hydrogen ions, and the activator, in the form of $AlCl_3.6H_2O$ or $FeCl_3.6H_2O$ in the desired molar ratio (1:1-6:1), were dissolved in 500 ml of water. 10.00 g of granules of $CaCO_3$ about 1 mm in diameter (approximately 100 mmoles, corresponding to 200 mvals) were added to the clear solution. To evaluate and compare the reactivity of the unactivated and variously activated acid, the time until the termination of visible $CO_2$ formation and during which the granules were dissolved was measured.

The experimental relation between the reaction time and the concentration of hydrogen ions was determined in a series of tests at different concentrations of hydrochloric acid. It was possible to correlate the measured reaction times with mean $H^+$ activities expressed in mvals of HCl per 500 ml from the calibration curve obtained from these results and illustrated in FIG. 1.

Figure 2:
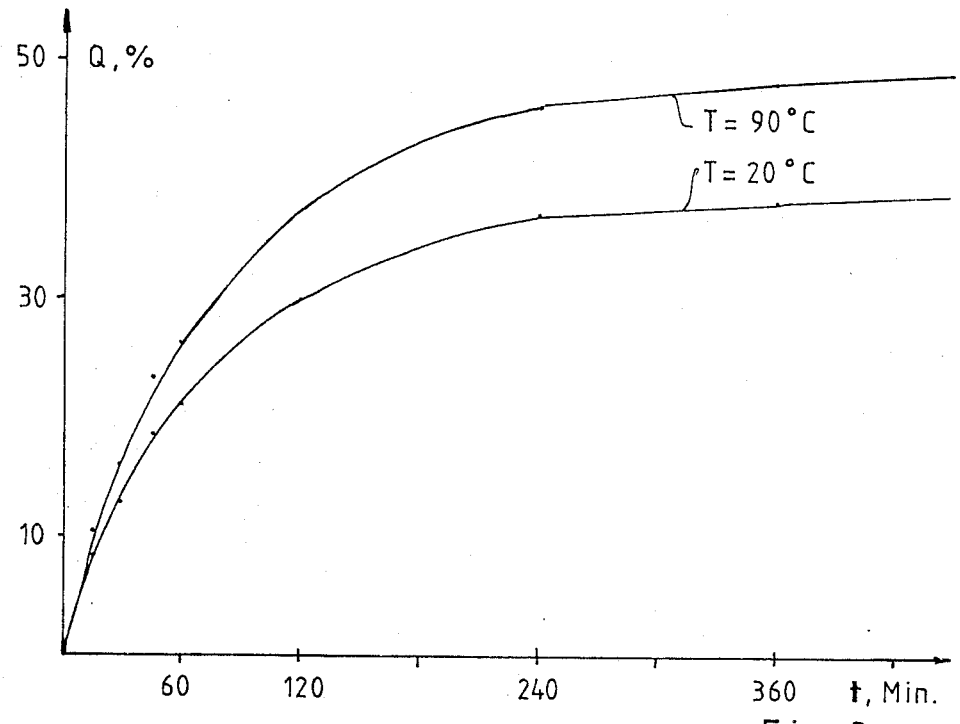
FIG. 2 is a graph which shows the effectiveness of aluminum chloride against scale at various temperatures.

As is evident from Table 1, phosphoric acid can be activated powerfully enough by the addition of aluminum chloride to dissolve scale in less than ½ the time that the same concentration of the acid alone would take. The solution of aluminum chloride itself exhibits only a slight solvent reaction (FIG. 2).

Furthermore, as will be evident from Table 5, mixtures of acids, specifically of phosphoric and citric acids can be similarly activated to perform at a reaction rate that is 3 times higher, whereas the reactivity of the mixture alone is only equal to approximately the sum of that of its individual constituents.

Table 2 illustrates how the reaction rate of diphosphonobutanetricarboxylic acid can be accelerated by the addition of aluminum chloride or iron chloride to more than 3 or 4 times that of the acid alone.

Table 3 illustrates the activation of L-tartaric acid, which reacts only incompletely and results in precipitation when employed alone against the granules, by means of aluminum chloride or iron chloride in molar ratios of 3:1 to 2:1, with an increased amount of activator increasing the hydrochloric-acid equivalent slightly in the case of aluminum chloride and more than proportionally in the case of iron chloride, resulting in a reactivity similar to that attained with oxalic acid. It can also be inferred that neither oxalic acid nor the iron-chloride solution by themselves can dissolve much scale, whereas, mixed, they react with the scale with an HCl equivalent of 320 mmoles.

Table 4 illustrates how citric acid, which alone reacts only slowly and accompanied by precipitation with the granules, can be activated by aluminum chloride, although increasing the molar ratio from 3:1 to 2:1 does not increase the reactivity beyond an HCl equivalent of 285 mmoles. Activation with iron chloride at a molar ratio of 2:1 increases the reactivity to an HCl equivalent of 305 mmoles.

As is evident from Table 5, an extraordinarily high increase in the activity of 1-hydroxyethane-1,1-diphosphonic acid, which alone acts only very slowly and accompanied by precipitation, by adding aluminum chloride and in particular iron chloride. The beneficial combination with iron chloride in a molar ratio of 2:1 resulted in a reaction time of only 30 to 35 minutes, about half the optimal times attained in the examples illustrated in Tables 1 to 5.

Another series of tests was conducted with 103 mmoles of 2-phosphonobutane-1,2,4-tricarboxylic acid ("PBTC"), 34.3 to 51.5 mmoles of aluminum hexahydrate, and mixtures thereof. Instead of the 10 g of $CaCO_3$, however, 20 g, corresponding to 200 mmoles and 400 mvals were employed. The amount of undissolved $CaCO_2$ was determined after 12 hours of reaction, long after the termination of the apparent $CO_2$ formation that is. It will be evident that, although the acid alone dissolved 6.33 g of the granules and the aluminum chloride alone 4.18 g in one test and 5.94 g in the other, the combination accounted for 10.95 g is one test and 12.98 g in the other. Thus, the mixtures have a higher acid capacity for dissolving scale than do the constituents alone and are practical in this respect.

Since most circulating heaters in domestic automatic coffee and tea makers are made out of aluminum alloys, a comparable alloy was subjected to a series of tests to determine its sensitivity to acid corrosion. Table 6 shows the results. Surprisingly, even though the acid activity of the mixture of citric acid and aluminum chloride is, as is evident from lines 4 to 6 in Table 4, very high, their corrosiveness is lower than that of citric acid alone. There is also a more than proportional decrease in corrosion in practice, given that the residence time of the mixture until the total amount of scale dissolves, is essentially shorter than that of the constituents alone. Since, for example, the time for the mixture was more than 10 times shorter in the tests of the dissolution of scale at increased temperature than that for the aluminum-chloride solution alone, the mixture results, in spite of a corrosiveness on the part of the aluminum-chloride solution that is 5 times lower, in only ½ the level of corrosion during the abbreviated requisite application time.

The tests were carried out by suspending a strip of polished and degreased AlMg3 sheet 1 mm thick, 10 mm wide, and 70 mm long in solutions of citric acid, aluminum-hexahydrate chloride, a mixture of these constituent, and, for comparison, hydrochloric acid for 10 minutes at 90° C. and stirring the solution. The amount of aluminum dissolved was then determined.

Another series of test demonstrates that the effect of activating an acid at even the elevated temperature of 90° C. that purification is frequently carried out at in water heaters is similar. Thus, up to 96% of 10 g of granules of scale dissolved in a solution of 19 g of citric acid activated with 11 g of $AlCl_3.6H_2O$ in 500 ml. The results obtained with even an approximately 50% more concentrated solution of 30 g of citric acid alone in 500 m of water, however, were inferior, with only 70% dissolving in 10 minutes, and only 7% of the scale dissolved in 10 minutes in another high concentration of 24 g of aluminum-chloride hexahydrate.

FIG. 2 illustrates two curves demonstrating the low reactivity of the scale granules to aluminum-chloride hexahydrate at 20° and at 90° C. 10 g of the granules were treated subject to constant stirring in 500 m of a solution of 0.1 moles. The amount Q dissolved is plotted in terms of percent over time. Thus, $T=20°$ C. can be derived from FIG. 8 as a limiting value for the "practically no reaction" subject to comparable times in the reactions with the activated acids listed in Tables 1 to 5.

TABLE 1

Activating $H_3PO_4$ with $Al^{3+}$ and/or citric acid

| Acid | | Activator | | Acid-to-activator | Maximum reaction time | Mean HCl equivalent |
|---|---|---|---|---|---|---|
| Compound | mmoles | Compound | mmoles | molar ratio | t, minutes | mmoles |
|  |  | $AlCl_3.6H_2O$ | 80–100 |  | Practically no reaction. |  |
| $H_3PO_4$ | 240 | $AlCl_3.6H_2O$ | 80 | 3:1 | 135–140 | 290 |
| $H_3PO_4$ | 300 |  |  |  | 150 | 270 |
| $H_3PO_4$ | 300 | $AlCl_3.6H_2O$ | 100 | 3:1 | 60–70 | 310 |
| $H_3PO_4$ + citric acid | 125/83.3 |  |  |  | 310 |  |
| $H_3PO_4$ + citric acid | 125/83.3 | $AlCl_3.6H_2O$ | 83.3 | 3/2:1 | 90 | 290 |
| Citric acid | 83.3 |  |  |  | Slow reaction, much white precipitate. |  |

TABLE 2

Activating 2-phosphonobutane-1,2,4-tricarboxylic acid with $Al^{3+}$ or $Fe^{3+}$

| Acid | | Activator | | Acid-to-activator | Maximum reaction time | Mean HCl equivalent |
|---|---|---|---|---|---|---|
| Compound | mmoles | Compound | mmoles | molar ratio | t, minutes | mmoles |
| PBTC | 166.7 |  |  |  | 300 | 200 |
|  |  | $AlCl_3.6H_2O$ | 55–83 |  | Practically no reaction. |  |
|  |  | $FeCl_3.6H_2O$ | 55–83 |  | Practically no reaction. |  |
| PBTC | 166.7 | $AlCl_3.6H_2O$ | 55.6 | 3:1 | 105 | 285 |
| PBTC | 166.7 | $AlCl_3.6H_2O$ | 83.4 | 2:1 | 90 | 290 |
| PBTC | 166.7 | $FeCl_3.6H_2O$ | 55.6 | 3:1 | 80 | 295 |
| PBTC | 166.7 | $FeCl_3.6H_2O$ | 83.4 | 2:1 | 70 | 305 |

TABLE 3

Activating L-tartaric acid with $Al^{3+}$, $Fe^{3+}$, or oxalic acid

| Acid | | Activator | | Acid-to-activator | Maximum reaction time | Mean HCl equivalent |
|---|---|---|---|---|---|---|
| Compound | mmoles | Compound | mmoles | molar ratio | t, minutes | mmoles |
| L-tartaric acid | 250 |  |  |  | Reaction very slow and incomplete. |  |
|  |  | $AlCl_3.6H_2O$ | 83–125 |  | Practically no reaction. |  |
|  |  | $FeCl_3.6H_2O$ | 83–125 |  | Practically no reaction. |  |
| L-tartaric acid | 250 | $AlCl_3.6H_2O$ | 83.33 | 3:1 | 110 | app. 280 |
| L-tartaric acid | 250 | $AlCl_3.6H_2O$ | 125 | 2:1 | 100 | app. 290 |

TABLE 3-continued

Activating L-tartaric acid with $Al^{3+}$, $Fe^{3+}$, or oxalic acid

| Acid Compound | mmoles | Activator Compound | mmoles | Acid-to-activator molar ratio | Maximum reaction time t, minutes | Mean HCl equivalent mmoles |
|---|---|---|---|---|---|---|
| L-tartaric acid | 250 | $FeCl_3.6H_2O$ | 83.33 | 3:1 | 200 | app. 260 |
| L-tartaric acid | 250 | $FeCl_3.6H_2O$ | 125 | 2:1 | 60 | app. 320 |
| Oxalic acid | 250 | | | | Practically no reaction. | |
| Oxalic acid | 250 | $FeCl_3.6H_2O$ | 125 | 2:1 | 50–60 | 320 |

TABLE 4

Activating citric acid with $Al^{3+}$ or $Fe^{3+}$

| Acid Compound | mmoles | Activator Compound | mmoles | Acid-to-activator molar ratio | Maximum reaction time t, minutes | Mean HCl equivalent mmoles |
|---|---|---|---|---|---|---|
| Citric acid | 166.7 | | | | Slow reaction, much white precipitate. | |
| | | $AlCl_3.6H_2O$ | 55–100 | | Practically no reaction. | |
| Citric acid | 133.3 | $AlCl_3.6H_2O$ | 66.7 | 2:1 | 125 | 280 |
| Citric acid | 166.7 | $AlCl_3.6H_2O$ | 55.6 | 3:1 | 105–110 | 285 |
| Citric acid | 166.7 | $AlCl_3.6H_2O$ | 83.4 | 2:1 | 105–110 | 285 |
| Citric acid | 166.7 | $FeCl_3.6H_2O$ | 55.6 | 3:1 | 95 | 285 |
| Citric acid | 166.7 | $FeCl_3.6H_2O$ | 83.4 | 2:1 | 70 | 305 |
| | | $FeCl_3.6H_2O$ | 83.4 | | Practically no reaction. | |

TABLE 5

Activating 1-hydroxyethane-1,1-diphosphonic acid with $Al^{3+}$ or $Fe^{3+}$

| Acid Compound | mmoles | Activator Compound | mmoles | Acid-to-activator molar ratio | Maximum reaction time t, minutes | Mean HCl equivalent mmoles |
|---|---|---|---|---|---|---|
| HEDP | 166.7 | | | | Slow (more than 500 minutes) reaction, much white precipitate. | |
| | | $AlCl_3.6H_2O$ | 55–83 | | Practically no reaction. | |
| | | $FeCl_3.6H_2O$ | 55–83 | | Practically no reaction. | |
| HEDP | 166.7 | $AlCl_3.6H_2O$ | 55.6 | 3:1 | 65 | 310 |
| HEDP | 166.7 | $AlCl_3.6H_2O$ | 83.4 | 2:1 | 40 | 350 |
| HEDP | 166.7 | $FeCl_3.6H_2O$ | 83.4 | 2:1 | 30–35 | 370 |

TABLE 6

Corrosiveness as measured on $AlMg_3$

| Acid Compound | mmoles | Activator Compound | mmoles | Acid-to-activator molar ratio | Corrosiveness % |
|---|---|---|---|---|---|
| | | $AlCl_3.6H_2O$ | 166 | | 0.27 |
| Citric acid | 333 | | | | 1.87 |
| Citric acid | 333 | $AlCl_3.6H_2O$ | 166 | 3:2 | 1.26 |
| Hydrochloric acid | 570 | | | | 59.9 |

It will be appreciated that the instant specification and claims are set forth by way of illustration and not limitation, and that various modifications and changes may be made without departing from the spirit and scope of the present invention.

What is claimed is:

1. A method of dissolving either a precipitate or deposit that contains calcium carbonate, the method consisting essentially of contacting the precipitate or deposit with a mixture comprising a first acid, said first acid being a Lewis acid in a concentration of 10 to 1000 mmoles/l, and a second acid, said second acid being a medium-strength to weak protonic acid or a partly deprotonated acid that yields at least one proton, said partly deprotonated acid being selected from the group consisting of polyphosphoric acid and its partly deprotonated anions, $H_2PO_3^-$, boric acid and its partly deprotonated stages, formic acid, acetic acid, propionic acid, glycolic acid, glyoxylic acid, lactic acid, malonic acid, maleic acid, succinic acid, polyacrylic acid, citric acid, malic acid, racemic acid, the mono- and dicarboxylic acids of triose, tetrose, pentose, hexose, and heptose and their biopolymeric forms, polyhydroxy and polyaldehyde carboxylic acids, alpha-amino acids, carbohydrates with vicinal dihydroxy groups, nitrilo-triacetic acid, partly deprotonated EDTA stages, partly deprotonated DTPA stages, nitrilo-tris(methylene-phosphonic acid), ethylene diamine-tetra-(methylene-phosphonic acid), diethylene triamine-penta-(methylene-phosphonic acid), hexamethylene diamine-tetra-(methylenephosphonic acid), n-(phosphonomethyl)glycine and n-(phosphonomethyl)iminodiacetic acid, with the molar ratio of the second acid to the Lewis acid being between 1:1 and 6:1, the Lewis acid being a solution of at least one salt of a strong acid with cations selected from the group consisting of cations of a 3-valence main-group element, cations of a 3-valence transition element, cations of a 3-valence lanthanide, cations of a 3-valence actinide, cations of a 4-valence main-group element, cations of a 4-valence transition element, cations of a 4-valence lanthanide and cations of a 4-valence actinide.

2. A method according to claim 1, wherein the cations correspond to metals that the calcium carbonate is deposited on or that the resultant mixture is in contact with during the dissolution.

3. A method according to claim 1, wherein the 3-valence main-group element is aluminum.

4. A method according to claim 1, wherein the 3-valence transition element is iron.

5. A method according to claim 1, wherein the concentration of the second acid is 100 to 500 mmoles/liter.

6. A method according to claim 1, wherein the molar ratio is 2:1 to 3:1.

7. A method according to claim 1, wherein the Lewis acid is a solution of aluminum-chloride hydrate, and wherein the second acid is selected from the group consisting of citric acid, L-tartaric acid, oxalic acid, 2-phosphonobutane-1,2,4-tricarboxylic acid, and 1-hydroxyethane-1,1-diphosphonic acid and wherein the mixture is employed to dissolve deposits on aluminum alloys.

8. A method according to claim 1, wherein the Lewis acid is a solution of iron-trichloride hydrate, and wherein the second acid is selected from the group consisting of citric acid, L-tartaric acid, oxalic acid, 2-phosphonobutane-1,2,4-tricarboxylic acid, 1-hydroxyethane-1,1-diphosphonic acid and combinations thereof and wherein the mixture is employed to dissolve deposits on alloys that mainly contain iron.

* * * * *